United States Patent
Yuwaki et al.

(10) Patent No.: US 11,020,901 B2
(45) Date of Patent: Jun. 1, 2021

(54) THREE-DIMENSIONAL SHAPING APPARATUS AND METHOD OF CONTROLLING THREE-DIMENSIONAL SHAPING APPARATUS

(71) Applicant: Seiko Epson Corporation, Tokyo (JP)

(72) Inventors: Kohei Yuwaki, Shiojiri (JP); Koichi Saito, Matsumoto (JP); Kazuhide Nakamura, Asahi (JP)

(73) Assignee: Seiko Epson Corporation

(*) Notice: Subject to any disclaimer, the term of this patent is extended or adjusted under 35 U.S.C. 154(b) by 0 days.

(21) Appl. No.: 16/698,394

(22) Filed: Nov. 27, 2019

(65) Prior Publication Data
US 2020/0171745 A1    Jun. 4, 2020

(30) Foreign Application Priority Data

Nov. 29, 2018  (JP) .............................. JP2018-222958

(51) Int. Cl.
*B29C 64/209* (2017.01)
*B29C 64/118* (2017.01)
(Continued)

(52) U.S. Cl.
CPC .......... *B29C 64/209* (2017.08); *B29C 64/118* (2017.08); *B29C 64/393* (2017.08);
(Continued)

(58) Field of Classification Search
CPC . B29C 64/106; B29C 48/2528; B29C 64/343; B29C 48/30; B29C 48/00;
(Continued)

(56) References Cited

U.S. PATENT DOCUMENTS 4,107,246 A * 8/1978 LaSpisa ............... G05D 7/0605
                                                              264/40.7
5,633,021 A * 5/1997 Brown ..................... B29C 64/40
                                                              425/375
(Continued)

FOREIGN PATENT DOCUMENTS

EP       2772347 A1 *  9/2014  ............. B29C 64/20
EP       3581365 A1 * 12/2019  ........... B29C 64/106
(Continued)

*Primary Examiner* — Joseph S Del Sole
*Assistant Examiner* — Margaret B Hayes
(74) *Attorney, Agent, or Firm* — Harness, Dickey & Pierce, P.L.C.

(57) ABSTRACT

A three-dimensional shaping apparatus includes a plasticizing portion plasticizing a material to generate a shaping material, a nozzle discharging the shaping material, a first flow path communicating with the plasticizing portion, a second flow path communicating with the nozzle, a through hole provided between the first flow path and the second flow path along a first direction intersecting a direction from the plasticizing portion toward the nozzle, a discharge control mechanism having a third flow path communicable with the first flow path and the second flow path, and configured to be slidable within the through hole, and a control portion controlling the plasticizing portion and the discharge control mechanism to shape the three-dimensional shaping object. The control portion slides the discharge control mechanism to change an operating state of the discharge control mechanism to any of a first state in which a discharge amount of the shaping material from the nozzle can be adjusted by making the first flow path, the second flow path, and the third flow path be in communication, and a second state in which the first flow path, the second flow path, and the third flow path are made in non-communication.

6 Claims, 7 Drawing Sheets

(51) Int. Cl.
  *B33Y 50/02* (2015.01)
  *B33Y 10/00* (2015.01)
  *B33Y 30/00* (2015.01)
  *B29C 64/393* (2017.01)

(52) U.S. Cl.
  CPC .............. *B33Y 10/00* (2014.12); *B33Y 30/00* (2014.12); *B33Y 50/02* (2014.12)

(58) Field of Classification Search
  CPC ......... B29C 48/92; B29C 48/02; B29C 64/20; B29C 64/321; B29C 64/118; B29C 64/209; B29C 45/27; B33Y 50/02; B33Y 10/00; B33Y 30/00; B33Y 40/00; B29B 7/248
  See application file for complete search history.

(56) References Cited

U.S. PATENT DOCUMENTS

| | | | | |
|---|---|---|---|---|
| 5,747,077 A | * | 5/1998 | Yoshida | B29C 48/0022 425/183 |
| 6,019,916 A | * | 2/2000 | Mizuguchi | B29C 48/385 264/39 |
| 8,961,167 B2 | * | 2/2015 | Swanson | B29C 64/112 425/375 |
| 2014/0291886 A1 | * | 10/2014 | Mark | B29C 64/209 264/163 |
| 2016/0009010 A1 | * | 1/2016 | Kariya | B29C 45/50 264/328.18 |
| 2016/0046073 A1 | * | 2/2016 | Hadas | B29C 48/345 264/211.21 |
| 2017/0157828 A1 | * | 6/2017 | Mandel | B29C 64/209 |
| 2017/0157831 A1 | * | 6/2017 | Mandel | B33Y 30/00 |
| 2017/0210069 A1 | * | 7/2017 | Stubenruss | B29C 64/118 |
| 2017/0210074 A1 | | 7/2017 | Ueda et al. | |

FOREIGN PATENT DOCUMENTS

| | | |
|---|---|---|
| JP | 2016-210152 A | 12/2016 |
| WO | WO-2015-182675 A1 | 12/2015 |

* cited by examiner

THREE-DIMENSIONAL SHAPING APPARATUS AND METHOD OF CONTROLLING THREE-DIMENSIONAL SHAPING APPARATUS

The present application is based on, and claims priority from, JP Application Serial Number 2018-222958, filed Nov. 29, 2018, the disclosure of which is hereby incorporated by reference herein in its entirety.

BACKGROUND

1. Technical Field

The present disclosure relates to a three-dimensional shaping apparatus and a method of controlling the three-dimensional shaping apparatus.

2. Related Art

In a three-dimensional shaping apparatus described in International Publication No. 2015/182675, supply of a material to a head is stopped by controlling a material feed apparatus which supplies a resin material to the head and a fiber introduction apparatus which supplies carbon fiber to the head.

In the apparatus described in International Publication No. 2015/182675, since the material feed apparatus and the fiber introduction apparatus are relatively far from the head, it is difficult to control output and stop of a shaping material from the head with good response. Therefore, there is a demand for technology which can output and stop the shaping material with good response.

SUMMARY

According to a first aspect of the present disclosure, a three-dimensional shaping apparatus shaping a three-dimensional shaping object is provided. A three-dimensional shaping apparatus includes a plasticizing portion plasticizing a material to generate a shaping material, a nozzle discharging the shaping material, a first flow path communicating with the plasticizing portion, a second flow path communicating with the nozzle, a through hole provided between the first flow path and the second flow path along a first direction intersecting a direction from the plasticizing portion toward the nozzle, a discharge control mechanism having a third flow path communicable with the first flow path and the second flow path, and configured to be slidable within the through hole, and a control portion controlling the plasticizing portion and the discharge control mechanism to shape the three-dimensional shaping object, in which the control portion slides the discharge control mechanism to change an operating state of the discharge control mechanism to any of a first state in which a discharge amount of the shaping material from the nozzle can be adjusted by making the first flow path, the second flow path, and the third flow path be in communication, and a second state in which the first flow path, the second flow path, and the third flow path are made in non-communication.

DESCRIPTION OF EXEMPLARY EMBODIMENTS

A. First Embodiment

Figure 1:
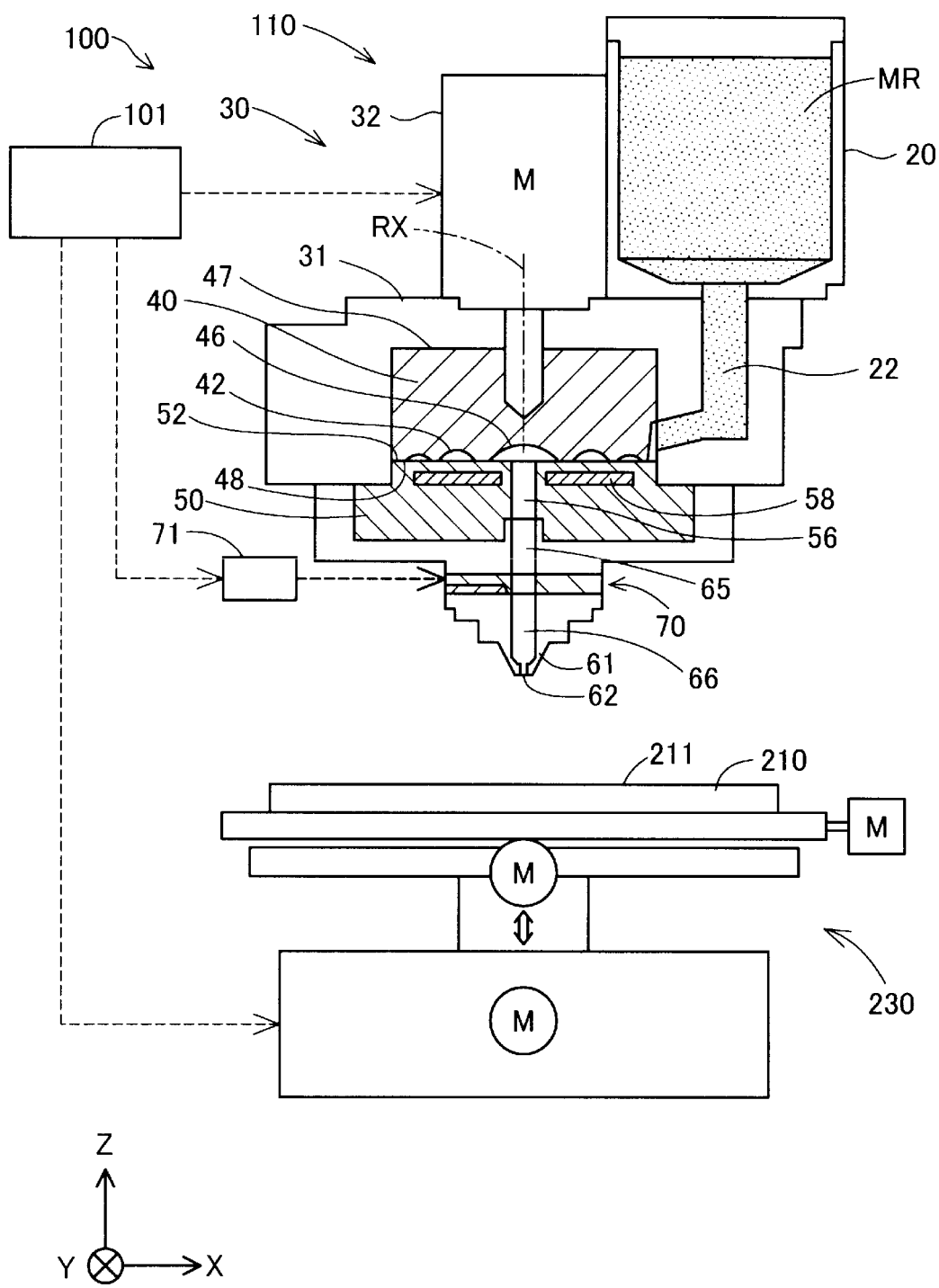
FIG. 1 is an explanatory view showing a schematic configuration of a three-dimensional shaping apparatus.

FIG. 1 is an explanatory view showing a schematic configuration of a three-dimensional shaping apparatus 100 in a first embodiment. In FIG. 1, arrows along X, Y, and Z directions orthogonal to one another are represented. The X direction and the Y direction are directions along a horizontal direction, and the Z direction is a vertically upward direction. In the other figures, arrows along the X, Y, and Z directions are appropriately represented. The X, Y, Z directions in FIG. 1 and the X, Y, and Z directions in the other figures represent the same direction.

The three-dimensional shaping apparatus 100 includes a control portion 101, a shaping portion 110 which generates and discharges a shaping material, a table 210 for shaping a base of a three-dimensional shaping object, and a movement mechanism 230 which controls a discharge position of the shaping material.

The control portion 101 controls the entire operation of the three-dimensional shaping apparatus 100 to perform shaping processing which shapes the three-dimensional shaping object. The control portion 101 is constituted with a computer including one or a plurality of processors and a main storage apparatus. The control portion 101 performs various functions by the processor executing a program read in the main storage apparatus. Further, a part of the functions of the control portion 101 may be realized by a hardware circuit. In the shaping processing performed by the control portion 101, the shaping portion 110 and the movement mechanism 230 are controlled in accordance with shaping data of the three-dimensional shaping object.

The shaping portion 110 discharges the melted paste-like shaping material to a target position on the table 210 under the control of the control portion 101. The shaping portion 110 includes a material supply portion 20 which is a source of a material MR before the material MR is converted to the shaping material, a plasticizing portion 30 converting the material MR to the shaping material, a nozzle 61 having a discharge port 62 which discharges the shaping material toward the table 210, a discharge control mechanism 70 controlling a discharge amount of the shaping material from the nozzle 61, a first flow path 65 communicating with the plasticizing portion 30, and a second flow path 66 communicating with the nozzle 61.

The material supply portion 20 supplies the plasticizing portion 30 with the material MR to generate the shaping material. The material supply portion 20 is constituted with, for example, a hopper which accommodates the material MR. The material supply portion 20 is coupled to the plasticizing portion 30 via a communication passage 22. The material MR is introduced into the material supply portion 20 in a form of, for example, a pellet or a powder, or the like. Details of the material MR will be described later.

The plasticizing portion 30 plasticizes at least a part of the material MR supplied from the material supply portion 20 to generate the paste-like shaping material exhibiting fluidity, and guides the shaping material to the nozzle 61. The plasticizing portion 30 has a screw case 31, a drive motor 32, a flat screw 40 and a screw facing portion 50. The flat screw 40 is also called a "scroll". The screw facing portion 50 is also called a "barrel". The plasticizing portion 30 may plasticize all of the material MR, or may plasticize a part of the material MR components, for example, when the material MR includes a plurality of components. FIG. schematically shows a sectional configuration of the plasticizing portion 30, and hatching indicating the sectional portion is omitted as appropriate.

The flat screw 40 has a substantially cylindrical shape whose height along a central axis RX thereof is smaller than a diameter thereof. In the present embodiment, the flat screw 40 is disposed such that the central axis RX is parallel to the Z direction.

The flat screw 40 is housed in the screw case 31. An upper surface 47 side of the flat screw 40 is coupled to the drive motor 32, and the flat screw 40 rotates around the central axis RX in the screw case 31 by a rotational drive force generated by the drive motor 32. The drive motor 32 drives under the control of the control portion 101.

A groove portion 42 is formed on a lower surface 48 of the flat screw 40. The communication passage 22 of the material supply portion 20 described above communicates with the groove portion 42 from a side surface of the flat screw 40.

The lower surface 48 of the flat screw 40 faces an upper surface 52 of the screw facing portion 50. A space is formed between the groove portion 42 of the lower surface 48 of the flat screw 40 and the upper surface 52 of the screw facing portion 50. The material MR is supplied from the material supply portion 20 to the space. Specific configurations of the flat screw 40 and the groove portion 42 will be described later.

In the screw facing portion 50, a heater 58 for heating the material MR is embedded. The material MR supplied to the groove portion 42 of the flat screw 40 flows along the groove portion 42 by rotation of the flat screw 40 while being melted in the groove portion 42 and is guided to a center portion 46 of the flat screw 40 as the shaping material. The paste-like shaping material flowing into the center portion 46 is supplied to the nozzle 61 through a communication hole 56 provided at a center of the screw facing portion 50. In the shaping material, all types of substances constituting the shaping material may not have to be melted. The shaping material may be converted into a state having fluidity as a whole by melting at least one type of substance among the substances constituting the shaping material.

The nozzle 61 discharges the shaping material generated in the plasticizing portion 30 from the discharge port 62 at a tip thereof toward the table 210.

The discharge control mechanism 70 has a third flow path 73 which can communicate with the first flow path 65 which communicates with the plasticizing portion 30 and the second flow path 66 which communicates with the nozzle 61. A through hole 72 is formed in a casing of the three-dimensional shaping apparatus 100 between the first flow path 65 and the second flow path 66, along a first direction which intersects a direction from the plasticizing portion 30 toward the nozzle 61. The discharge control mechanism 70 is configured to be slidable inside the through hole 72. The direction from the plasticizing portion 30 toward the nozzle 61 is a −Z direction in the present embodiment. In the present embodiment, the first direction is a −X direction, and a second direction, which is the direction opposite to the first direction, is a +X direction. The first direction may be inclined with respect to the X direction. A drive portion 71 is coupled to the discharge control mechanism 70. The drive portion 71 slides the discharge control mechanism 70 under the control of the control portion 101. The drive portion 71 is constituted with, for example, a stepping motor, and a rack-and-pinion mechanism or a ball screw mechanism which converts a rotational force of the stepping motor into translational motion of the discharge control mechanism 70.

The table 210 is disposed at a position facing the discharge port 62 of the nozzle 61. In the present embodiment, an upper surface 211 of the table 210 facing the discharge port 62 of the nozzle 61 is disposed horizontally, that is, parallel to the X and Y directions.

The movement mechanism 230 is configured to be able to change a relative position of the table 210 and the nozzle 61. In the present embodiment, a position of the nozzle 61 is fixed, and the movement mechanism 230 moves the table 210. The movement mechanism 230 is constituted with a three-axis positioner which moves the shaping stage 210 in the three directions of the X, Y, and Z directions by drive force of three motors. The movement mechanism 230 changes relative positional relationship between the nozzle 61 and the table 210 under the control of the control portion 101.

In another embodiment, a configuration may be adopted in which instead of moving the table 210 by the movement mechanism 230, the movement mechanism 230 moves the nozzle 61 relative to the table 210 with a position of the table 210 fixed. Further, a configuration in which the table 210 is moved in the Z direction by the movement mechanism 230 and the nozzle 61 is moved in the X and Y directions, or a configuration in which the table 210 is moved in the X and Y directions by the movement mechanism 230 and the nozzle 61 is moved in the Z direction, may be adopted. Even in these configurations, the relative positional relationship between the nozzle 61 and the table 210 can be changed.

In the following, "movement of the nozzle 61" or "scanning of the nozzle 61" means change in a relative position of the nozzle 61 with respect to the table 210 unless otherwise specified. Further, when "movement speed of the nozzle 61" is mentioned, it means a relative speed of the nozzle 61 with respect to the table 210.

Figure 2:
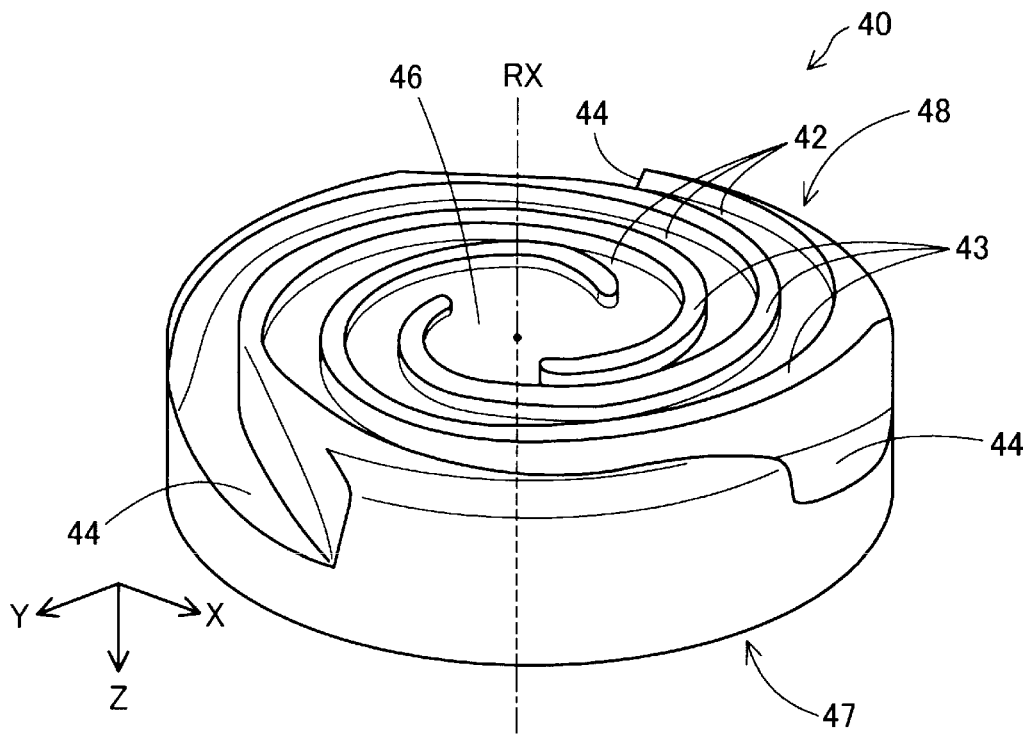
FIG. 2 is a schematic perspective view showing a configuration on a lower surface side of a flat screw.

FIG. 2 is a schematic perspective view showing a configuration of the lower surface 48 side of the flat screw 40. In FIG. 2, a position of the central axis RX of the flat screw 40 is illustrated by an alternate long and short dash line. As described with reference to FIG. 1, a groove portion 42 is provided on the lower surface 48 of the flat screw 40 facing the screw facing portion 50. Hereinafter, the lower surface 48 is also referred to as the "grooved surface 48".

The center portion 46 of the grooved surface 48 of the flat screw 40 is constituted with a recess portion to which one end of the groove portion 42 is coupled. The center portion 46 faces the communication hole 56 of the screw facing portion 50 as shown in FIG. 1. In the first embodiment, the center portion 46 intersects with the central axis RX.

The groove portion 42 of the flat screw 40 constitutes a so-called scroll groove. The groove portion 42 extends in a spiral shape so as to draw an arc from the center portion 46 to an outer circumference of the flat screw 40. The groove portion 42 may be configured to extend helically. The grooved surface 48 is provided with a projection strip portion 43 which constitutes a side wall portion of the groove portion 42 and extends along each groove portion 42.

The groove portion 42 is continuous to a material inlet 44 formed on a side of the flat screw 40. The material inlet 44 is a part which receives the material MR supplied via the communication passage 22 of the material supply portion 20.

An example of the flat screw 40 having the three groove portions 42 and the three projection strip portions 43 is shown in FIG. 2. The number of the groove portions 42 and the projection strip portions 43 provided in the flat screw 40 is not limited to three. Only the one groove portion 42 may be provided in the flat screw 40, or a plurality of the groove portions 42 such as two or more may be provided. Further, an arbitrary number of the projection strip portions 43 may be provided in accordance with the number of the groove portions 42.

An example of the flat screw 40 in which the material inlet 44 is formed at three places is shown in FIG. 2. The number of the material inlets 44 provided in the flat screw 40 is not limited to three. In the flat screw 40, the material inlet 44 may be provided at only one place, or may be provided at a plurality of places such as two or more places.

Figure 3:
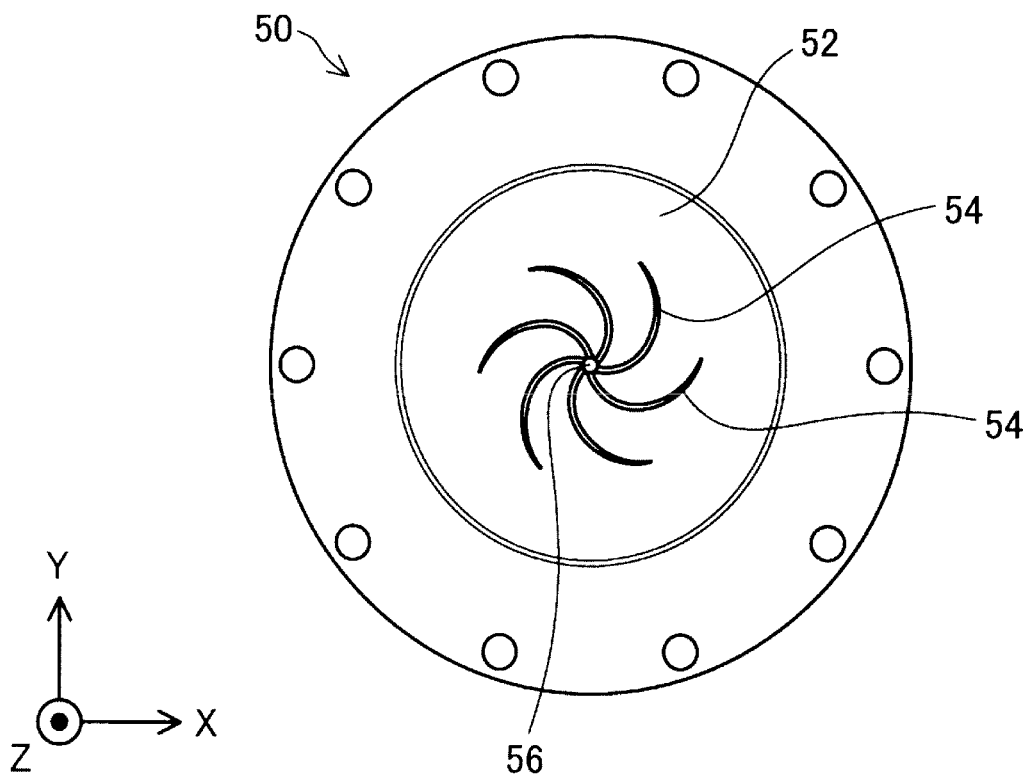
FIG. 3 is a schematic plan view showing an upper surface side of a screw facing portion.

FIG. 3 is a schematic plan view showing the upper surface 52 side of the screw facing portion 50. The upper surface 52 of the screw facing portion 50 faces the grooved surface 48 of the flat screw 40 as described above. Hereinafter, the upper surface 52 is also referred to as the "screw facing surface 52". At a center of the screw facing surface 52, the communication hole 56 described above for supplying the shaping material to the nozzle 61 is formed.

In the screw facing surface 52, a plurality of guide grooves 54 which are coupled to the communication hole 56 and spirally extending from the communication hole 56 toward an outer circumference of the screw facing surface 52, are formed. The plurality of guide grooves 54 have a function of guiding the shaping material flowing into the center portion 46 of the flat screw 40 to the communication hole 56. As described with reference to FIG. 1, the screw facing portion 50 has the heater embedded therein. Melting of the material MR in the plasticizing portion 30 is realized by heating by the heater 58 and the rotation of the flat screw 40.

As the flat screw 40 rotates, the material MR supplied from the material inlet 44 is guided to the groove portion 42 and moved toward the center portion 46 while being heated in the groove portion 42. The material MR melts and becomes more fluid as the material MR approaches the center portion 46, and is converted into the shaping material. The shaping material collected in the center portion 46 flows out from the communication hole 56 to the first flow path 65 due to the internal pressure generated in the center portion 46, is guided to the nozzle 61, and is discharged from the discharge port 62.

Figure 4:
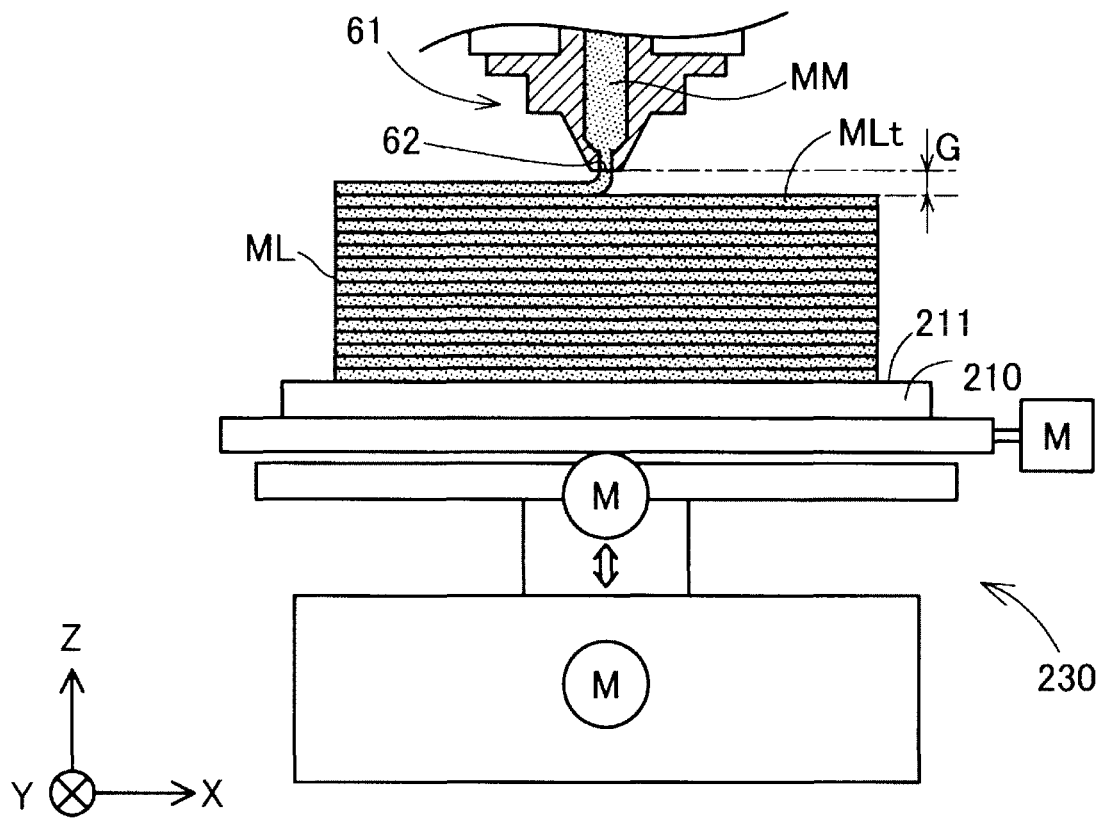
FIG. 4 is a view schematically showing an aspect of how a three-dimensional shaping object is shaped.

FIG. 4 is a view schematically showing how the three-dimensional shaping object is shaped by the three-dimensional shaping apparatus 100. In the three-dimensional shaping apparatus 100, as described above, a shaping material MM is generated in the plasticizing portion 30. Then, while the nozzle 61 is moved in a direction along the upper surface 211 of the table 210 by the movement mechanism 230, a shaping material MM is discharged from the nozzle 61 toward the upper surface 211 of the table 210.

Here, a layer formed of the shaping material MM discharged by the shaping processing when the nozzle 61 is at a same height position with respect to the upper surface 211 of the table 210 is referred to as a "shaping layer ML". The control portion 101 shapes the three-dimensional shaping object by moving the position of the nozzle 61 in the Z direction and further stacking the shaping material MM by the next shaping processing on the shaping layer ML formed by the previous shaping processing. That is, the three-dimensional shaping apparatus 100 manufactures the three-dimensional shaping object by stacking the shaping layer ML in multiple layers.

When the shaping layer ML is formed, it is desirable that a following gap G is maintained between a tip of the nozzle 61 and a planned portion MLt on which the shaping material MM discharged from the nozzle 61 is to be stacked at a vicinity of a position immediately below the nozzle 61. When the shaping material MM is discharged on the shaping layer ML, the planned portion MLt, on which the shaping material MM is to be discharged, is an upper surface of the shaping layer ML located below the nozzle 61.

It is preferable that a size of the gap G is equal to or greater than a hole diameter Dn at the discharge port 62 of the nozzle 61, and more preferably equal to or greater than 1.1 times the hole diameter Dn. In this way, the shaping material MM discharged from the discharge port 62 of the nozzle 61 is stacked in a free state in which the shaping material MM is not pressed against the planned portion MLt. As a result, a cross-sectional shape of the shaping material MM discharged from the nozzle 61 can be suppressed from being broken, and surface roughness of the three-dimensional shaping object can be reduced. Further, in a configuration in which a heater is provided around the nozzle 61, overheating of the shaping material MM by the heater can be prevented by forming the gap G, and discoloration and deterioration by the overheating of the shaping material MM after stacking can be suppressed. On the other hand, it is preferable that the size of the gap G is 1.5 times or less than the hole diameter Dn, and particularly preferable that the size is 1.3 times or less. As a result, positional deviation of the discharge position of the shaping material MM with respect to the planned portion MLt and a decrease in adhesion between the shaping layers ML are suppressed.

Figure 5:
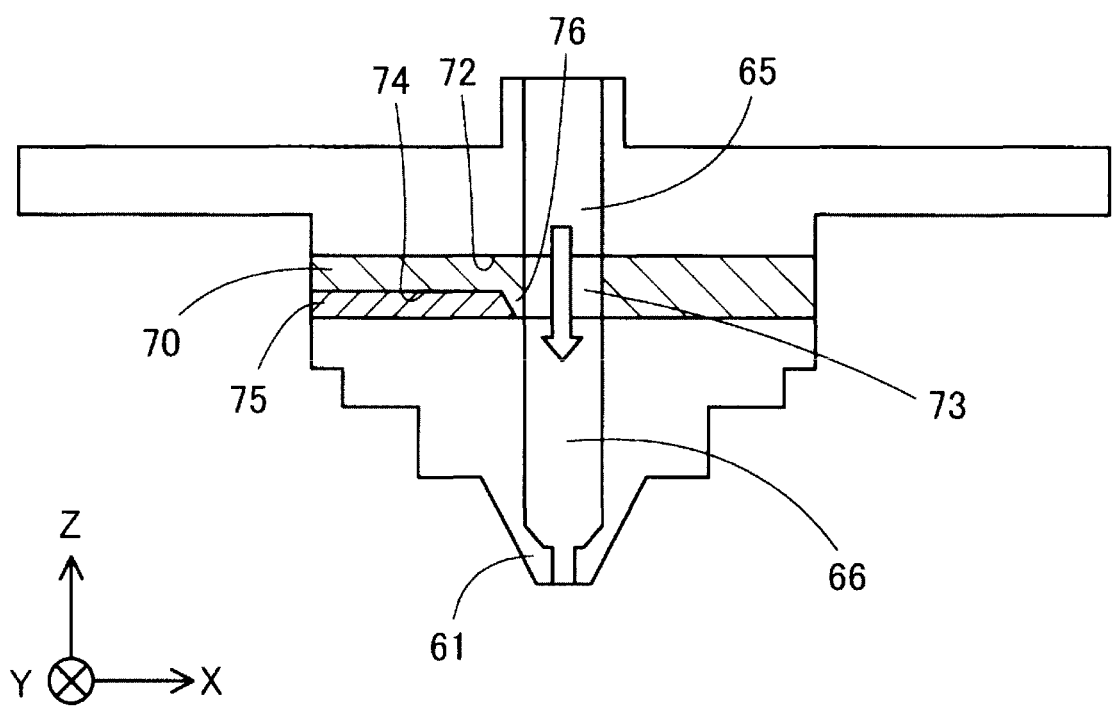
FIG. 5 is a first schematic sectional view showing a configuration of a discharge control mechanism.

FIG. 5 is a first schematic sectional view showing a configuration of the discharge control mechanism 70. In FIG. 5, hatching of portions other than the discharge control mechanism 70 is omitted as appropriate. The discharge control mechanism 70 is a cylindrical body disposed so as to penetrate between the first flow path 65 and the second flow path 66 of the three-dimensional shaping apparatus 100 along the X direction. A through hole 72 through which the discharge control mechanism 70 is inserted is provided in the casing of the three-dimensional shaping apparatus 100 along the X direction. The discharge control mechanism 70 is provided with the third flow path 73 along the Z direction at a position connectable to the first flow path 65 and the second flow path 66. In the present embodiment, the first flow path 65, the second flow path 66, and the third flow path 73 have the same flow path sectional area. FIG. 5 shows a state in which the first flow path 65, the second flow path 66, and the third flow path 73 are in a complete communication state along the Z direction. In the state shown in FIG. 5, the shaping material supplied from the plasticizing portion 30 is discharged from the nozzle 61 at the maximum flow amount.

The discharge control mechanism 70 has a recess portion 74 on the second flow path 66 side. The recess portion 74 is disposed at a predetermined interval from the third flow path 73 in a −X direction. The interval is smaller than a diameter of the third flow path 73. An end of the recess portion 74 on the −X direction side is open to an outside. A projection portion 75 which fits into the recess portion 74 is formed inside the through hole 72. The projection portion 75 just fits into the recess portion 74 in a state in which the third flow path 73 communicates with the first flow path 65 and the second flow path 66 with the largest opening. The projection portion 75 is fixed in the through hole 72 and does not move. A wall portion 76 is formed in the discharge control mechanism 70 between the projection portion 75 and the third flow path 73, in other words, between the recess portion 74 and the third flow path 73. The wall portion 76 is a part of the inner wall of the third flow path 73. The wall portion 76 is in contact with the projection portion 75 from the +X direction side. Therefore, the projection portion 75 functions as a regulating portion which regulates the movement of the discharge control mechanism 70 in the −X direction.

Figure 6:
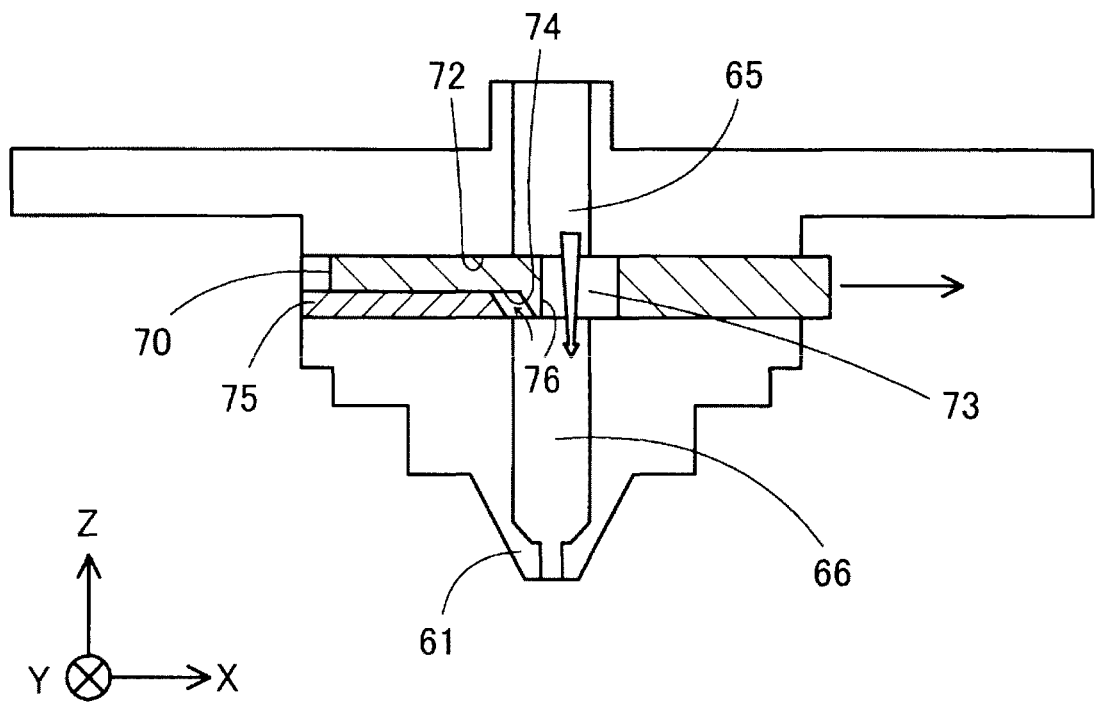
FIG. 6 is a second schematic sectional view showing a configuration of the discharge control mechanism.

FIG. 6 is a second schematic sectional view showing a configuration of the discharge control mechanism 70. FIG. 6 shows a state in which the discharge control mechanism 70 is slid to the +X direction. As shown in FIG. 6, when the discharge control mechanism 70 slides, a position of the third flow path 73 in the X direction is shifted from the first flow path 65 and the second flow path 66, so that flow path resistance increases. Therefore, the control portion 101 can adjust a flow amount of the shaping material discharged from the nozzle 61 by driving the drive portion 71 to adjust a slide movement amount of the discharge control mechanism 70 and according to the slide movement amount. When the discharge control mechanism 70 is slid in the +X direction, the recess portion 74 communicates with the second flow path 66. Therefore, a part of the shaping material in the second flow path 66 flows into the recess portion 74. When the discharge control mechanism 70 is slid to +X direction, a position of the X direction in which the projection portion 75 fits in the recess portion 74 is relatively changed according to the slide movement amount of the discharge control mechanism 70, and a distance between the wall portion 76 and the projection portion 75 becomes longer. Therefore, the control portion 101 can relatively change the position at which the projection portion 75 fits in the recess portion 74 and change a volume of the recess portion 74 communicating with the second flow path 66 by moving the discharge control mechanism 70 in the +X direction.

Figure 7:
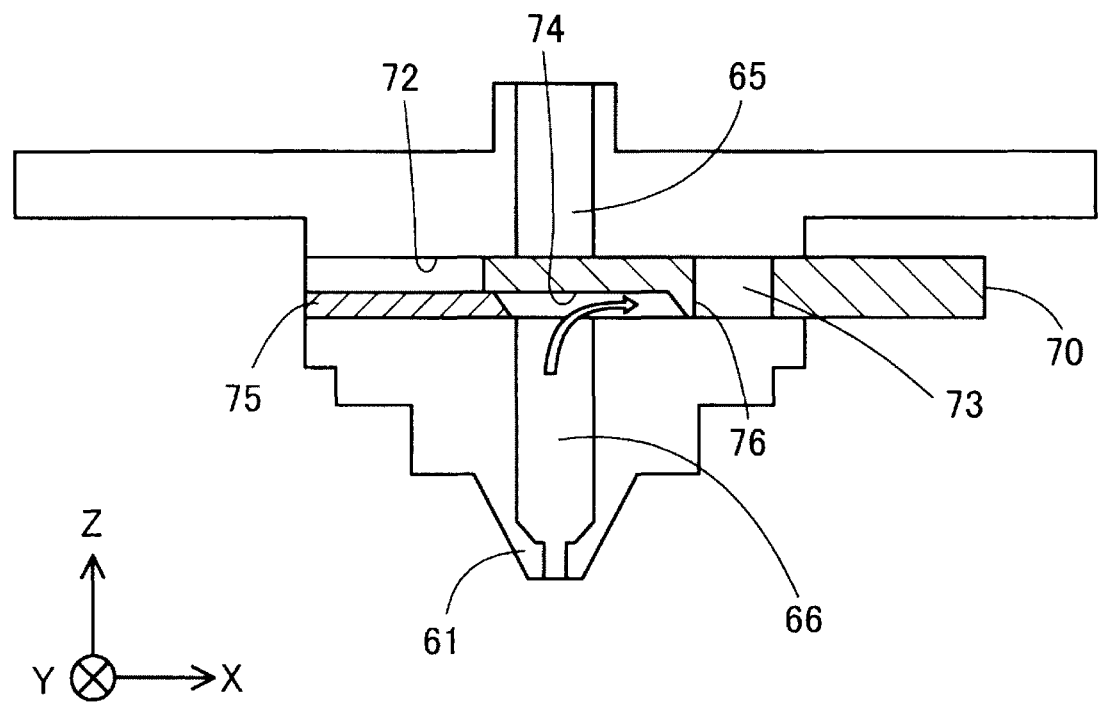
FIG. 7 is a third schematic sectional view showing a configuration of the discharge control mechanism.

FIG. 7 is a third schematic sectional view showing a configuration of the discharge control mechanism 70. FIG. 7 shows a state in which the first flow path 65, the second flow path 66, and the third flow path 73 are in a non-communication state as a result of sliding the discharge control mechanism 70 in the +X direction. As shown in FIG. 7, when the third flow path 73 is drawn into the through hole 72, causing the first flow path 65, the second flow path 66, and the third flow path 73 to be in the non-communication state, the shaping material does not flow from the plasticizing portion 30 to the nozzle 61, so that discharge of the shaping material from the nozzle 61 is stopped. Further, in the present embodiment, the discharge control mechanism 70 is further slid in the +X direction so that the recess portion 74 enters the through hole 72, thereby generating a negative pressure in the recess portion 74. Therefore, at least a part of the shaping material in the second flow path 66 is drawn into the recess portion 74, and the shaping material discharged from the nozzle 61 can be trimmed.

Figure 8:
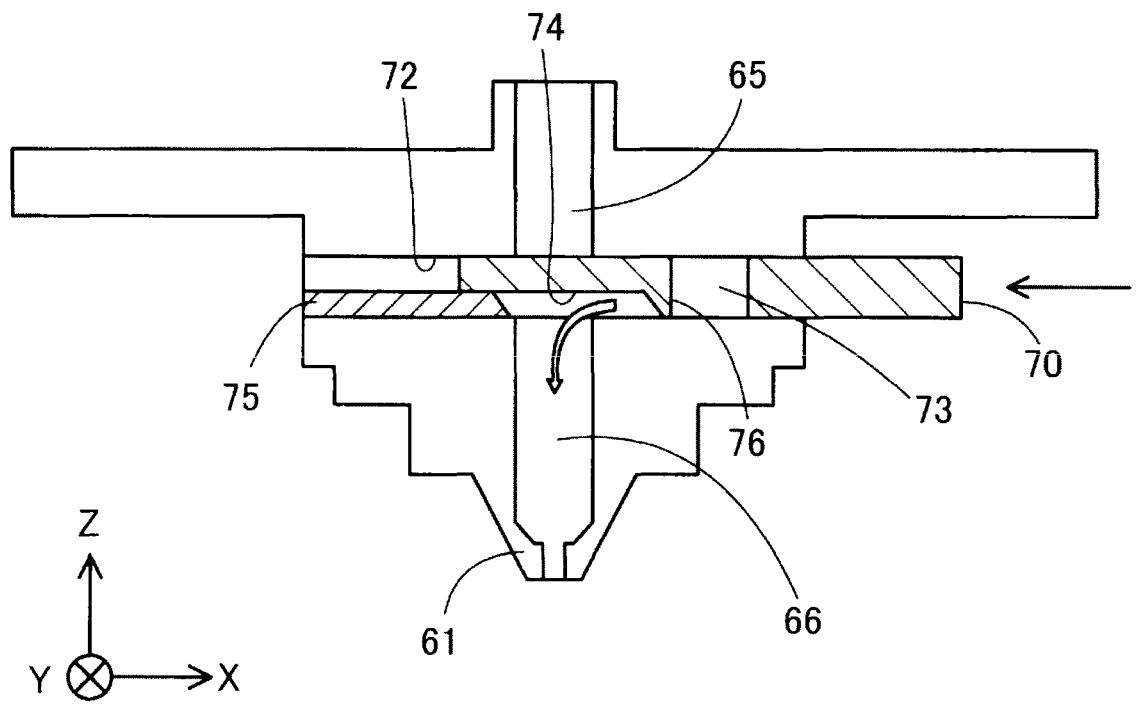
FIG. 8 is a fourth schematic sectional view showing a configuration of the discharge control mechanism.

FIG. 8 is a fourth schematic sectional view showing a configuration of the discharge control mechanism 70. When the discharge control mechanism 70 is slid in the −X direction after the shaping material is drawn into the recess portion 74, the shaping material is supplied from the recess portion 74 toward the nozzle 61 with a state in which the shaping material from the first flow path 65 to the nozzle 61 is stopped.

Figure 9:
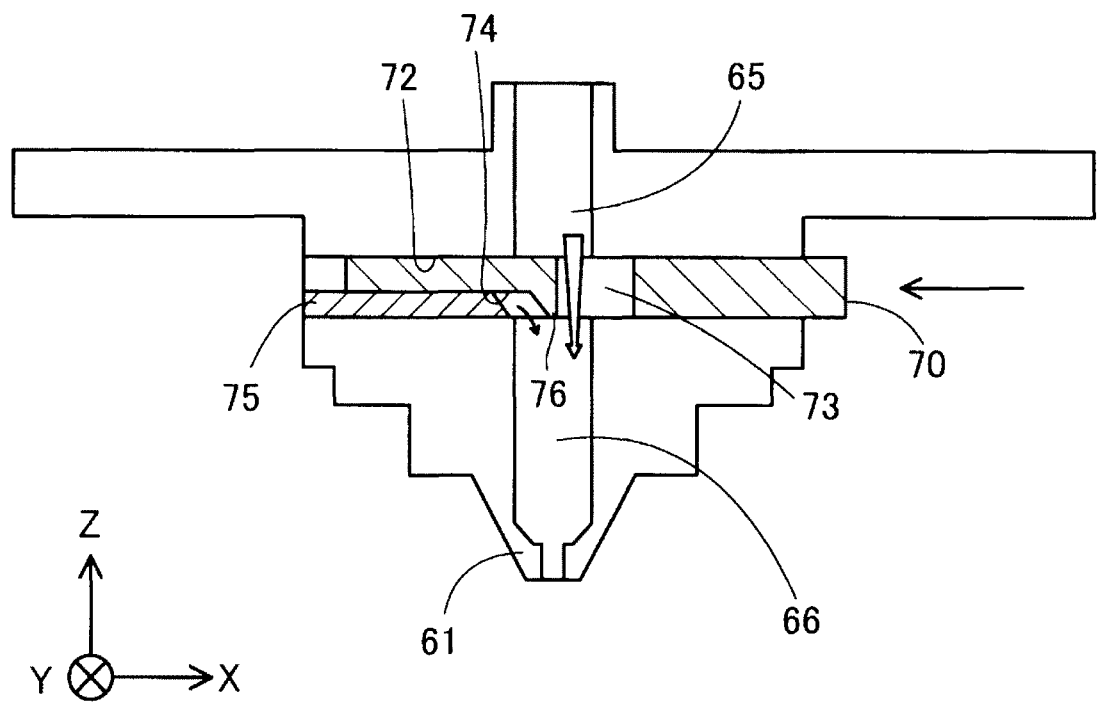
FIG. 9 is a fifth schematic sectional view showing a configuration of the discharge control mechanism.

FIG. 9 is a fifth schematic sectional view showing a configuration of the discharge control mechanism 70. When the discharge control mechanism 70 is further slid in the −X direction from the state shown in FIG. 8, the first flow path 65, the second flow path 66, and the third flow path 73 are in a communication state with each other as shown in FIG. 9. Accordingly, the material supply from the recess portion 74 is not gradually performed, and the shaping material is supplied from the first flow path 65 to the nozzle 61 through the third flow path 73.

As described above, the discharge control mechanism 70 of the present embodiment includes three functions such as (1) a function turning on/off the output of the shaping material from the nozzle 61, (2) a function adjusting the discharge amount of the shaping material, and (3) a function of a plunger which sucks the shaping material from the nozzle 61 and supplies the shaping material to the nozzle 61.

The control portion 101 switches an operation state of the discharge control mechanism 70 between a first state and a second state by sliding the discharge control mechanism 70 described above. The first state is a state in which the first flow path 65, the second flow path 66, and the third flow path 73 are set to be in a communication state so that it is possible to adjust the discharge amount of the shaping material discharged from the nozzle 61. The second state is a state in which the first flow path 65, the second flow path 66, and the third flow path 73 are set in a non-communication state. In the present embodiment, the control portion 101 slides the discharge control mechanism 70 in the +X direction to switch the operation state of the discharge control mechanism 70 from the first state to the second state and further slides the discharge control mechanism 70 in the +X direction, so that at least the part of the shaping material in the second flow path 66 is caused to flow into the recess portion 74. In the present embodiment, the control portion 101 slides the discharge control mechanism 70 in the −X direction to cause at least the part of the shaping material flowed into the recess portion 74 to flow out to the second flow path 66, and further slides the discharge control mechanism 70 in the −X direction to switch the operation state of the discharge control mechanism 70 from the second state to the first state. Control contents of the control portion 101 will be described in detail below with reference to a flowchart.

Figure 10:
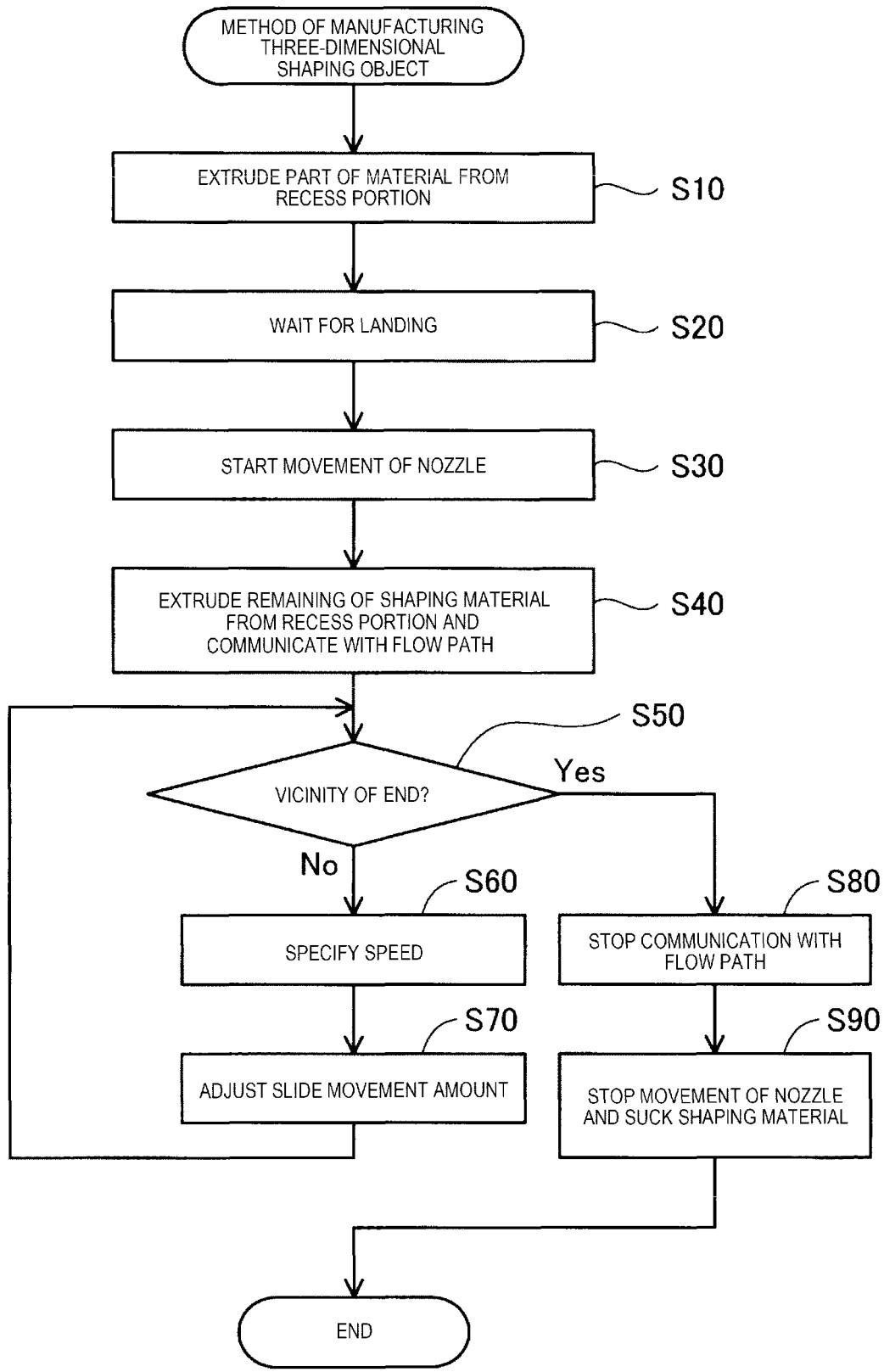
FIG. 10 is a flowchart showing a method of controlling the three-dimensional shaping apparatus.
Figure 11:
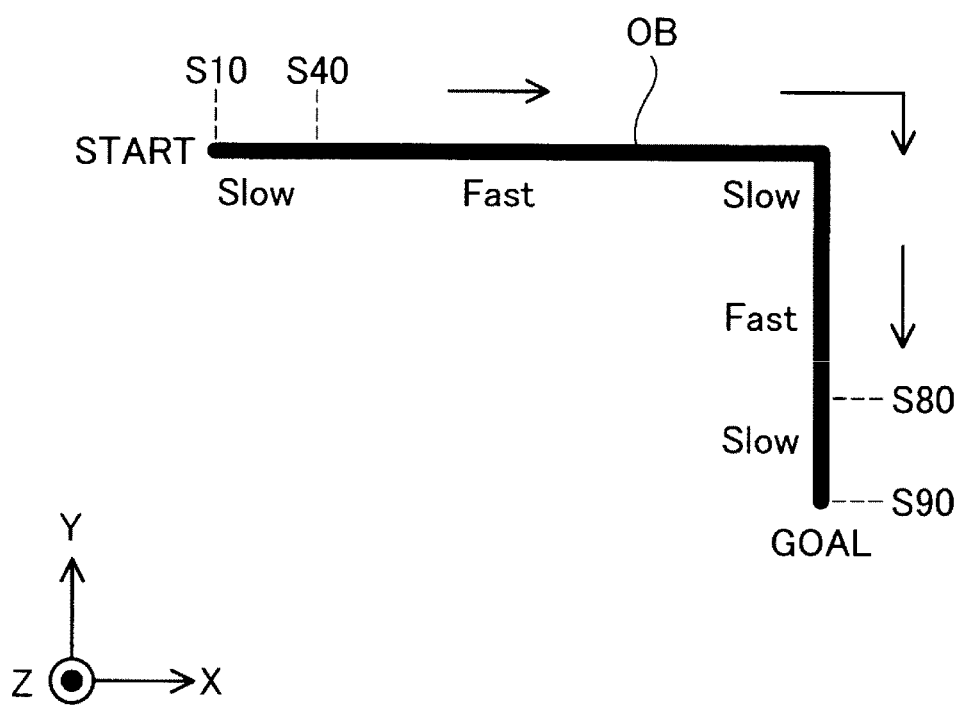
FIG. 11 is a view schematically showing a part of the three-dimensional shaping object.
Figure 12:
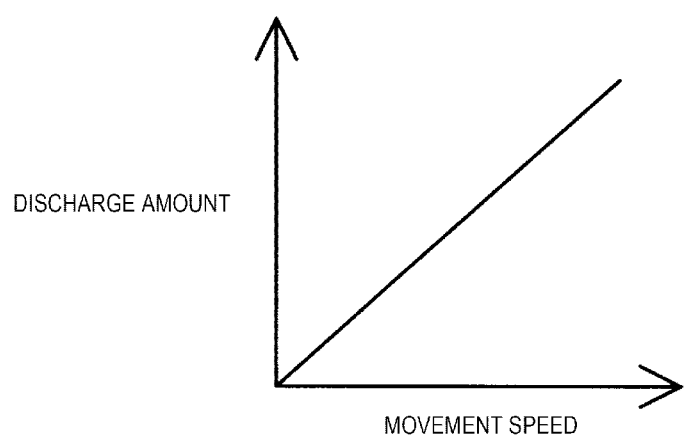
FIG. 12 is a view showing a relationship between a movement speed of a nozzle and a discharge amount of a shaping material.

FIG. 10 is a flowchart showing a method of controlling the three-dimensional shaping apparatus 100. FIG. 11 is a view schematically showing apart of a three-dimensional shaping object OB. FIG. 12 is a diagram showing a relationship between the movement speed of the nozzle 61 and the discharge amount of the shaping material.

A method of control shown in FIG. 10 is realized by executing a shaping program read into the main storage apparatus by the control portion 101 of the three-dimensional shaping apparatus 100. The flowchart shown in FIG. 10 is a flowchart corresponding to a process from the start of the discharge of the shaping material from the nozzle 61 to the stop of the discharge, and in practice, the entirety of the three-dimensional shaping object is shaped by repeatedly performing the flowchart shown in FIG. 10. When the method of control is started, the operation state of the discharge control mechanism 70 is the second state, that is, the state in which the first flow path 65, the second flow path 66, and the third flow path 73 are set in the non-communication state, and the shaping material from the second flow path 66 is sucked into the recess portion 74 and reserved therein. Such a state can be caused by changing the operation state of the discharge control mechanism 70 from the first state to the second state while the nozzle 61 is moved to a predetermined location and the shaping material is discarded. Further, even when a series of processing described below is completed, the above state is obtained.

When starting or resuming the discharge of the shaping material, the control portion 101 first slides the discharge control mechanism 70 in the −X direction to extrude the part of the shaping material reserved in the recess portion 74 in a step S10, and waits for a predetermined period in a step S20. In FIG. 11, extrusion of the shaping material is performed at a position indicated as "START". Awaiting period in the step S20 is a period required for the shaping material extruded from the recess portion 74 to land on the table 210 or the shaping-completed shaping layer ML, and is a predetermined period. The table 210 and the shaping-completed shaping layer are hereinafter referred to as the "table 210 or the like". The amount of the shaping material extruded from the recess portion 74 in the step S10 is, for example, 50% by mass of the shaping material reserved in the recess portion 74. The amount is predetermined according to thickness of the shaping material when the shaping material is stacked on the table 210 or the like and the gap G described above. The thickness of the discharged shaping material is also referred to as a "line width". The control portion 101 can adjust an extrusion amount of the shaping material by controlling the drive portion 71 to control the slide movement amount of the discharge control mechanism 70.

After the waiting in the step S20 is completed, in a step S30, the control portion 101 starts the movement of the nozzle 61 in accordance with shaping data. The shaping data includes, for example, information indicating movement path of the nozzle 61 and the movement speed of the nozzle 61. Simultaneously with the start of the movement of the nozzle 61 or immediately after the start of the movement of the nozzle 61, the control portion 101 further slides the discharge control mechanism 70 in the −X direction in a step S40, thereby extruding the remaining portion reserved in the recess portion 74 from the recess portion 74, and causes the third flow path 73 to be in a communication state with the first flow path 65 and the second flow path 66 to start supplying the shaping material from the plasticizing portion 30 to the nozzle 61. Immediately after the movement of the nozzle 61 is started in the step S30, the movement speed of the nozzle 61 is a relatively slow speed, and after the step S40, the movement speed of the nozzle 61 is a relatively high speed in a linear part of the three-dimensional shaping object OB. The movement speed of the nozzle 61 is slow at a corner of the three-dimensional shaping object OB.

In the step S40, the control portion 101 controls the discharge amount of the shaping material by adjusting the slide movement amount of the discharge control mechanism 70. In the present embodiment, as shown in FIG. 12, the control portion 101 controls the slide movement amount of the discharge control mechanism 70 so that the discharge amount of the shaping material from the nozzle 61 increases as the movement speed of the nozzle 61 increases. As the slide movement amount from the position at which the wall portion 76 of the discharge control mechanism 70 in contact with the projection portion 75 in the +X direction increases, the discharge amount of the shaping material decreases. The "discharge amount of the shaping material" refers to the flow rate of the shaping material discharged from the nozzle 61 and to the amount of shaping material discharged from the nozzle 61 per unit time. The movement speed of the nozzle 61 can be specified by acquiring a value specified by the shaping data from the shaping data. In another embodiment, the movement mechanism 230 may be provided with a rotary encoder, a speed sensor, or an acceleration sensor to measure the movement speed of the nozzle 61.

In a step S50, the control portion 101 determines whether or not a current position of the nozzle 61 is at a vicinity of an end of the movement path of the nozzle 61 represented by the shaping data. The "vicinity of the end of the movement path" will be described later. When it is determined that the position of the nozzle 61 is not at the vicinity of the end of the movement path of the nozzle 61, the control portion 101 specifies the movement speed of the nozzle 61 in a step S60, and according to the specified movement speed, adjusts the slide movement amount of the discharge control mechanism 70 to control the discharge amount of the shaping material in a step S70.

In the steps S40 and S70, the control portion 101 controls the discharge amount so that the discharge amount of the shaping material per unit volume in the three-dimensional shaping object is constant before and after the movement speed of the nozzle 61 changes. That is, in the present embodiment, for example, in FIG. 11, the control portion 101 controls the discharge control mechanism 70 to control the discharge amount so that a line width of the shaping material discharged to the table 210 or the like does not change at fixed distances in the part indicated as "Slow" and the part indicated as "Fast" which have different movement speeds of the nozzle 61.

When it is determined that the position of the nozzle 61 is at the vicinity of the end of the movement path of the nozzle 61 in the step S50, the control portion 101 controls the discharge control mechanism 70 to cause the first flow path 65, the second flow path 66, and the third flow path 73 to be in the communication state and stop the flow communication of the shaping material from the plasticizing portion 30 to the nozzle 61 in a step S80. In a step S90, the control portion 101 stops the movement of the nozzle 61 and controls the discharge control mechanism 70 to suck the part of the shaping material in the second flow path 66 into the recess portion 74. The "vicinity of the end of the movement path" is a position which is traced back from the end of the movement path up to a predetermined distance along the path. The distance to be traced back is determined such that the amount of the shaping material discharged from the nozzle 61 from a time at which the first flow path 65, the second flow path 66, and the third flow path 73 are set in the non-communication state in the step S80 until the shaping material is sucked by the recess portion 74 in the step S90, is determined by experiment or calculation in advance and the shaping in the distance is possible by the amount.

The control portion 101 manufactures the entire three-dimensional shaping object by performing the method of controlling the three-dimensional shaping apparatus described above for all the movement paths recorded in the shaping data.

According to the three-dimensional shaping apparatus 100 of the present embodiment described above, instead of controlling a rotation speed of the flat screw 40, it is possible to perform the discharge control of the shaping material from the nozzle 61 by merely sliding the discharge control mechanism 70 provided in the vicinity of the nozzle 61. Therefore, with a simple configuration, it is possible to output and stop the shaping material with good response.

In the present embodiment, the discharge control mechanism 70 is provided with the recess portion 74 whose volume changes according to the slide movement amount of the discharge control mechanism 70. Therefore, by adjusting the slide movement amount of the discharge control mechanism 70, it is possible to flow the shaping material from the recess portion 74, or to flow the shaping material into the recess portion 74, and to further output and stop the shaping material with better response.

In the present embodiment, the discharge control mechanism 70 is slid to switch the state of the first flow path 65, the second flow path 66, and the third flow path 73 to the non-communication state, and then the shaping material in the second flow path 66 is flowed in the recess portion 74 by further sliding the discharge control mechanism 70. As a result, the shaping material discharged from the nozzle 61 is drawn into the nozzle 61, and the shaping material is trimmed. Accordingly, it is possible to suppress the excessive discharge of the shaping material.

Further, in the present embodiment, before switching the state of the first flow path 65, the second flow path 66, and the third flow path 73 from the non-communication state to the communication state, the discharge control mechanism 70 is slid so that the shaping material in the recess portion 74 is flowed to the second flow path 66. Therefore, the shaping material is supplied from the recess portion 74 to the nozzle 61 earlier than the shaping material is supplied from the plasticizing portion 30 to the nozzle 61. Therefore, the shaping material can be output with better response.

Further, in the three-dimensional shaping apparatus 100 of the present embodiment, the slide movement amount of the discharge control mechanism 70 according to the movement speed of the nozzle 61 is controlled to control the discharge amount of the shaping material, so that the discharge amount of the shaping material per unit volume in the three-dimensional shaping object is constant before and after the movement speed of the nozzle 61 changes. Therefore, it is possible to suppress a change in the line width of the shaping material stacked on the table 210 or the like in apart in which the movement speed of the nozzle 61 changes, such as an end or a corner of the three-dimensional shaping object. Therefore, the shaping precision of the three-dimensional shaping object can be improved.

Further, in the present embodiment, since the flat screw 40 is adopted in the plasticizing portion 30, it is possible to miniaturize the three-dimensional shaping apparatus 100.

Here, the material of the three-dimensional shaping object used in the three-dimensional shaping apparatus 100 described above will be described. In the three-dimensional shaping apparatus 100, the three-dimensional shaping object can be shaped, for example, with various materials such as a material having thermoplasticity, a metal material, and a ceramic material as a main material. Here, the "main material" means a central material which forms a shape of the three-dimensional shaping object, and means a material which accounts for a content of 50% by weight or more in the three-dimensional shaping object. The shaping material described above includes one in which the main material is melted alone, and one in which a part of the components contained together with the main material is melted and made into a paste.

When a material having thermoplasticity is used as the main material, the shaping material is generated in the plasticizing portion 30 by the material being plasticized. A "plasticization" means that heat is applied to the material having thermoplasticity to melt the material.

As the material having thermoplasticity, for example, the following thermoplastic resin material can be used.
Examples of Thermoplastic Resin Materials
General purpose engineering plastics such as polypropylene resin (PP), polyethylene resin (PE), polyacetal resin (POM), polyvinyl chloride resin (PVC), polyamide resin (PA), acrylonitrile butadiene styrene resin (ABS), polylactic acid resin (PLA), polyphenylene sulfide resin (PPS), polyetheretherketone (PEEK), polycarbonate (PC), modified polyphenylene ether, polybutylene terephthalate, and polyethylene terephthalate, or engineering plastics such as polysulfone, polyether sulfone, polyphenylene sulfide, polyarylate, polyimide, polyamide imide, polyether imide, and polyether ether ketone.

In the material having thermoplasticity, additives such as a wax, a flame retardant, an antioxidant, and a heat stabilizer may be mixed with a pigment, a metal, a ceramic, or the like. The thermoplastic material is plasticized and converted to a melted state in the plasticizing portion 30 by the rotation of the flat screw 40 and the heating of the heater 58. The shaping material generated by the melting of the thermoplastic material is discharged from the nozzle 61 and then cured by a decrease in temperature.

It is desirable that the material having thermoplasticity is ejected from the nozzle 61 in a completely melted state by being heated to a temperature higher than or equal to a glass transition point thereof. For example, it is desirable that the ABS resin which has a glass transition point of about 120° C. is at about 200° C. when discharged from the nozzle 61. A heater may be provided around the nozzle 61 in order to discharge the shaping material in such a high temperature state.

In the three-dimensional shaping apparatus 100, for example, the following metal material may be used as the main material instead of the material having thermoplasticity described above. In this case, it is desirable that components to be melted during the generation of the shaping material is mixed with the powder material made of the following metal material and the mixture as the material MR is introduced into the plasticizing portion 30.
Example of Metal Material
A single metal of magnesium (Mg), iron (Fe), cobalt (Co), chromium (Cr), aluminum (Al), titanium (Ti), copper (Cu), and nickel (Ni), or an alloy containing one or more of these metals
Examples of the Alloys Described Above
Maraging steel, stainless steel, cobalt chromium molybdenum, titanium alloy, nickel alloy, aluminum alloy, cobalt alloy, and cobalt chromium alloy In the three-dimensional shaping apparatus 100, it is possible to use a ceramic material as the main material instead of the metal material described above. As the ceramic material, for example, oxide ceramics such as silicon dioxide, titanium dioxide, aluminum oxide and zirconium oxide, and non-oxide ceramics such as aluminum nitride can be used. When the metal material or the ceramic material as described above is used as the main material, the shaping material disposed in the table 210 may be cured by sintering.

The powder material of the metal material or the ceramic material introduced to the material supply portion 20 as the material MR may be a single metal powder and an alloy powder, or a mixed material produced by mixing a plurality of types of ceramic material powders. Further, the powder material of the metal material or the ceramic material may be coated with, for example, a thermoplastic resin as exemplified above, or other thermoplastic resins. In this case, the thermoplastic resin may be melted to develop fluidity in the plasticizing portion 30.

For example, the following solvent may be added to the powder material of the metal material or the ceramic material which are introduced to the material supply portion 20 as the material MR. The solvent can be used by combining 1 type, or 2 or more types selected from the following.
Examples of Solvent Water, (poly) alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene and xylene, ketones such as methyl ethyl ketone, acetone, methyl isobutyl ketone, ethyl n-butyl ketone, diisopropyl ketone and acetylacetone, alcohols such as ethanol, propanol and butanol, tetraalkyl ammonium acetates, sulfoxide solvents such as dimethyl sulfoxide and diethyl sulfoxide, pyridine solvents such as gin, γ-picoline and 2,6-lutidine, and ionic liquids such as tetraalkyl ammonium acetate (for example, tetrabutyl ammonium acetate or the like) and butyl carbitol acetate In addition, for example, the following binder may be added to the powder material of the metal material or the ceramic material introduced as the material MR into the material supply portion 20.
Examples of Binders Acrylic resin, epoxy resin, silicone resin, cellulose resin or other synthetic resin, or PLA (polylactic acid), PA (polylactic acid), PPS (polyphenylene sulfide), PEEK (polyether ether ketone) or other thermoplastic resin

B. Other Embodiments (B-1) The three-dimensional shaping apparatus 100 is not limited to one which plasticizes the material by the flat screw 40. For example, the three-dimensional shaping apparatus 100 may be one which plasticizes the material by rotating an in-line screw instead of the flat screw 40.

(B-2) The discharge control mechanism 70 of the embodiment described above is a cylindrical shape. However, the shape of the discharge control mechanism 70 is not limited thereto. As long as the third flow path 73 is a shape which can be formed, the discharge control mechanism 70 may have a plate shape or a square bar shape.

(B-3) In the embodiment described above, the gap G between the tip of the nozzle 61 and the planned portion MLt in which the shaping material MM is stacked may be less than the hole diameter Dn at the discharge port 62 of the nozzle 61. In this case, the shaping material MM discharged from the discharge port 62 of the nozzle 61 is pressed against the planned portion MLt and can be stacked while following a wall of the shaping material already disposed at an adjacent position or a wall of the shaping material already disposed at a lower layer. As a result, since the shaping material is stacked so as to fill void in the vicinity of the planned portion MLt to be stacked, the three-dimensional shaping object with a low percentage of the void can be obtained and strength of the three-dimensional shaping object can be improved.

(B-4) In the embodiment described above, the discharge control mechanism 70 may not include the recess portion 74. Even when the discharge control mechanism 70 does not include the recess portion 74, the control portion 101 can control the discharge of the shaping material only by sliding the discharge control mechanism 70. Therefore, it is possible to output and stop the shaping material with good response.

C. Other Aspects

The present disclosure is not limited to each of the embodiments described above, and can be realized with various aspects in the range without departing from the gist thereof. For example, the present disclosure can be implemented as the following aspects. The technical features in each of the embodiments described above corresponding to the technical features in each of aspects described below may be replaced or combined as appropriate in order to solve part or all of the problems which the present disclosure includes or to accomplish part of all of the effects which the present disclosure achieves. In addition, unless the technical feature is described as essential in the present disclosure, the technical feature can be deleted as appropriate.

(1) According to a first aspect of the present disclosure, a three-dimensional shaping apparatus is provided that shapes a three-dimensional shaping object. A three-dimensional shaping apparatus includes a plasticizing portion plasticizing a material to generate a shaping material, a nozzle discharging the shaping material, a first flow path communicating with the plasticizing portion, a second flow path communicating with the nozzle, a through hole provided between the first flow path and the second flow path along a first direction intersecting a direction from the plasticizing portion toward the nozzle, a discharge control mechanism having a third flow path communicable with the first flow path and the second flow path, and configured to be slidable within the through hole, and a control portion controlling the plasticizing portion and the discharge control mechanism to shape the three-dimensional shaping object, in which the control portion slides the discharge control mechanism to change an operating state of the discharge control mechanism to any of a first state in which a discharge amount of the shaping material from the nozzle can be adjusted by making the first flow path, the second flow path, and the third flow path be in communication, and a second state in which the first flow path, the second flow path, and the third flow path are made in non-communication.

In such a three-dimensional shaping apparatus of the aspect, it is possible to control the discharge of the shaping material from the nozzle by merely sliding the discharge control mechanism. Therefore, it is possible to output and stop the shaping material with good response.

(2) In the three-dimensional shaping apparatus of the aspect, the discharge control mechanism may have a recess portion disposed at the second flow path side with an interval from the third flow path in the first direction, a projection portion which fits in the recess portion and is provided inside the through hole, and the control portion may move the discharge control mechanism in a second direction opposite to the first direction, thereby relatively changing a position at which the projection portion fits in the recess portion and changing a volume of the recess portion communicating with the second flow path. In such a three-dimensional shaping apparatus of the aspect, by adjusting the slide movement amount of the discharge control mechanism, it is possible to flow the shaping material from the recess portion, or to flow the shaping material into the recess portion from the second flow path. Therefore, it is possible to output and stop the shaping material with better response.

(3) In the three-dimensional shaping apparatus of the aspect, the control portion may slide the discharge control mechanism in the second direction to switch the operation state from the first state to the second state and further slide the discharge control mechanism in the second direction, so that at least a part of the shaping material in the second flow path is caused to flow into the recess portion. In such a three-dimensional shaping apparatus of the aspect, it is possible to suppress the excessive output of the shaping material.

(4) In the three-dimensional shaping apparatus of the aspect, the control portion may slide the discharge control mechanism in the first direction to cause at least the part of the shaping material flowed into the recess portion to flow out to the second flow path, and further slide the discharge control mechanism in the first direction to switch the operation state from the second state to the first state. In such a three-dimensional shaping apparatus of the aspect, the shaping material can be output with better response.

(5) In the three-dimensional shaping apparatus of the aspect, the plasticizing portion may include a flat screw having a grooved surface on which a groove portion is formed and a barrel including a facing surface facing the grooved surface of the flat screw, a communication hole formed on the facing surface, and a heater, and the plasticizing portion may generate the shaping material by melting at least a part of the material by rotation of the flat screw and heating by the heater and cause the shaping material to flow out of the communication hole to the first flow path. In such an aspect, the three-dimensional shaping apparatus can be miniaturized.

The present disclosure is not limited to the aspect as the three-dimensional shaping apparatus described above, and can be implemented in various forms. For example, it can be realized in the form of a method of controlling the three-dimensional shaping apparatus, a three-dimensional shaping method, a computer program for shaping the three-dimensional shaping object, a non-transitory recording medium which records the computer program, or the like.

What is claimed is:

1. A three-dimensional shaping apparatus shaping a three-dimensional shaping object, comprising:
    a plasticizing portion plasticizing a material to generate a shaping material;
    a nozzle discharging the shaping material;
    a first flow path communicating with the plasticizing portion;
    a second flow path communicating with the nozzle;
    a through hole provided between the first flow path and the second flow path along a first direction intersecting a direction from the plasticizing portion toward the nozzle;
    a discharge control mechanism having a third flow path communicable with the first flow path and the second flow path, the discharge control mechanism being slidable within the through hole relative to a projection portion that is fixed to the through hole, the projection portion having a sliding surface upon which the discharge control mechanism is configured to slide and having a terminal end closer to the second flow path than the sliding surface, and the discharge control mechanism including a recess portion disposed at a second flow path side with an interval from the third flow path in the first direction, the recess portion fitting in the projection portion; and
    a control portion that is embodied by a computer including one or more processors and a main storage apparatus, the control portion being configured to control the plasticizing portion and the discharge control mechanism to shape the three-dimensional shaping object, wherein
    the control portion slides the discharge control mechanism to change an operating state of the discharge control mechanism to any of
    a first state in which a discharge amount of the shaping material from the nozzle can be adjusted by making the first flow path, the second flow path, and the third flow path be in communication, and
    a second state in which the first flow path, the second flow path, and the third flow path are made in non-communication.

2. The three-dimensional shaping apparatus according to claim 1, wherein
    the control portion moves the discharge control mechanism in a second direction opposite to the first direction, thereby relatively changing a position at which the projection portion fits in the recess portion and changing a volume of the recess portion communicating with the second flow path.

3. The three-dimensional shaping apparatus according to claim 2, wherein
    the control portion slides the discharge control mechanism in the second direction to switch the operation state from the first state to the second state and further slides the discharge control mechanism in the second direction, so that at least a part of the shaping material in the second flow path is caused to flow into the recess portion.

4. The three-dimensional shaping apparatus according to claim 3, wherein
    the control portion slides the discharge control mechanism in the first direction to cause at least the part of the shaping material flowed into the recess portion to flow out to the second flow path, and further slides the discharge control mechanism in the first direction to switch the operation state from the second state to the first state.

5. The three-dimensional shaping apparatus according to claim 1, wherein
    the plasticizing portion includes
        a flat screw having a grooved surface on which a groove portion is formed and
        a barrel including a facing surface facing the grooved surface of the flat screw, a communication hole formed on the facing surface, and a heater, and
    the plasticizing portion generates the shaping material by melting at least a part of the material by rotation of the flat screw and heating by the heater and causes the shaping material to flow out of the communication hole to the first flow path.

6. A method for controlling a three-dimensional shaping apparatus,
    the three-dimensional shaping apparatus including
        a plasticizing portion plasticizing a material to generate a shaping material,
        a nozzle discharging the shaping material,
        a first flow path communicating with the plasticizing portion, a second flow path communicating with the nozzle, a through hole provided between the first flow path and the second flow path along a first direction intersecting a direction from the plasticizing portion toward the nozzle, and a discharge control mechanism having a third flow path communicable with the first flow path and the second flow path, the discharge control mechanism being slidable within the through hole relative to a projection portion that is fixed to the through hole, the projection portion having a sliding surface upon which the discharge control mechanism is configured to slide and having a terminal end closer to the second flow path than the sliding surface, and the discharge control mechanism including a recess portion disposed at the second flow path side with an interval from the third flow path in the first direction, the recess portion fitting in the projection portion, the method comprising:

sliding the discharge control mechanism to change an operating state of the discharge control mechanism to any of a first state in which a discharge amount of the shaping material from the nozzle can be adjusted by making the first flow path, the second flow path, and the third flow path be in communication, and a second state in which the first flow path, the second flow path, and the third flow path are made in non-communication.

* * * * *